W. C. BRISSE.
LINK BELT.
APPLICATION FILED OCT. 11, 1909.
955,377.
Patented Apr. 19, 1910.
2 SHEETS—SHEET 1.
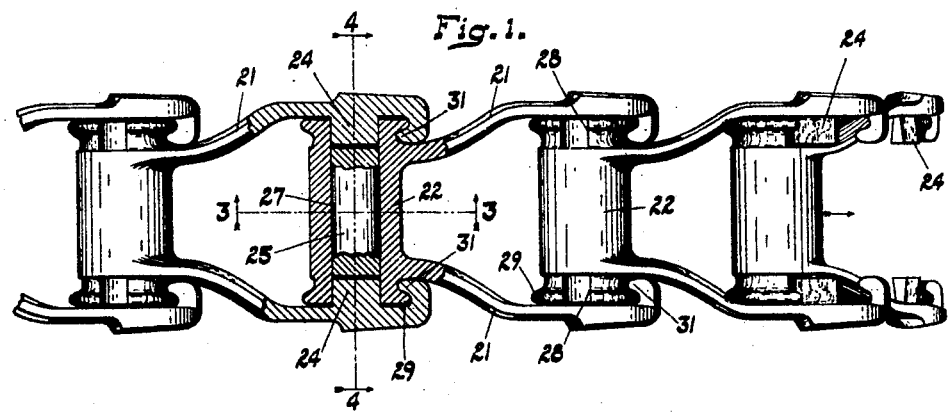
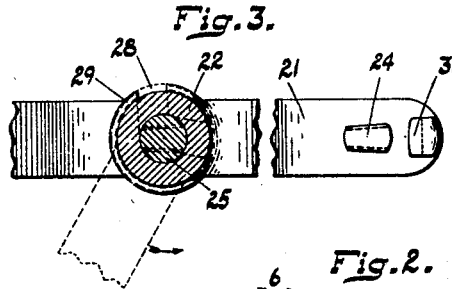
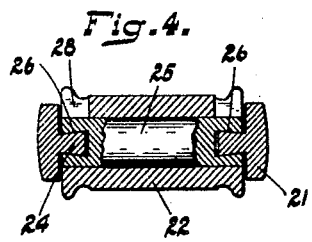
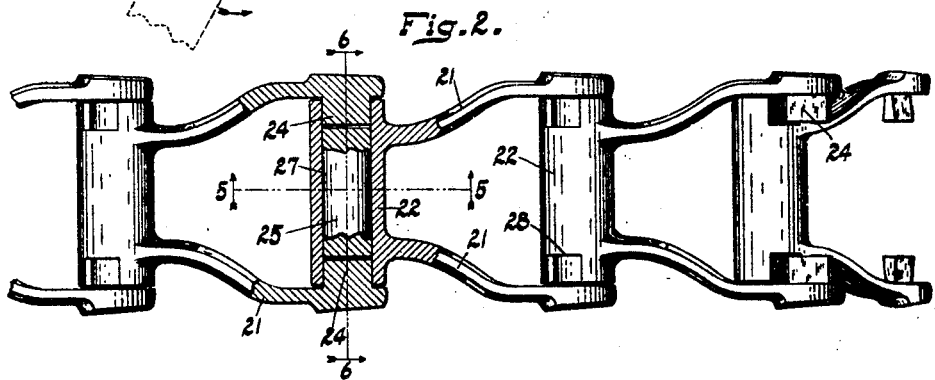
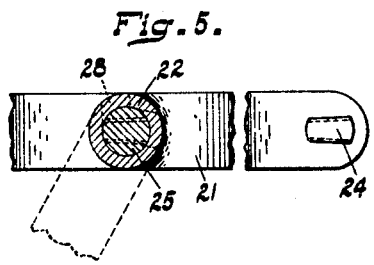
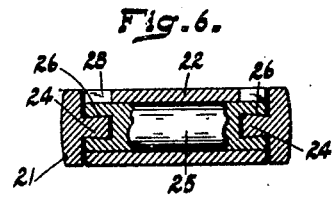
Witnesses
Walter Troemel.
Thomas H. McMeans
Inventor
William C. Brisse.
By Bradford Hood
Attorneys

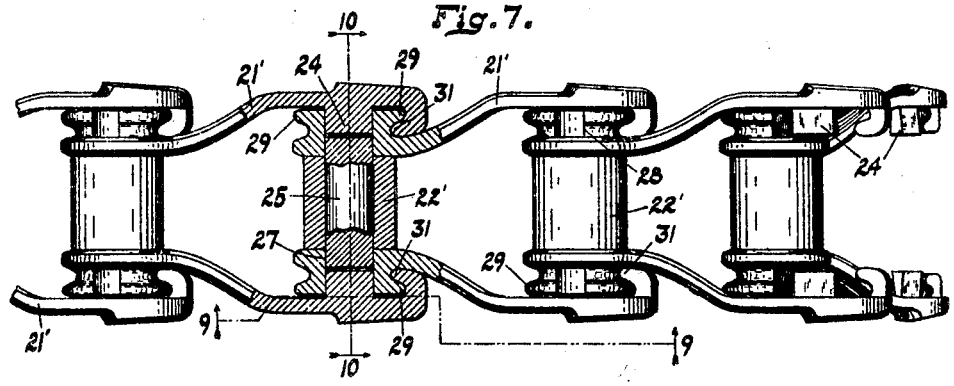
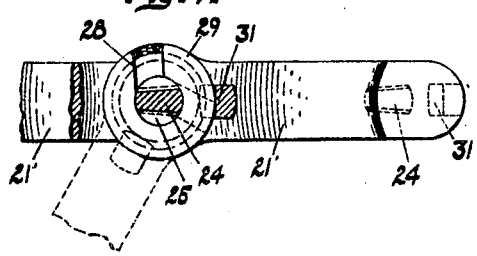
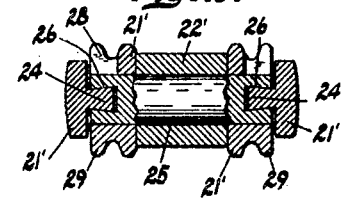
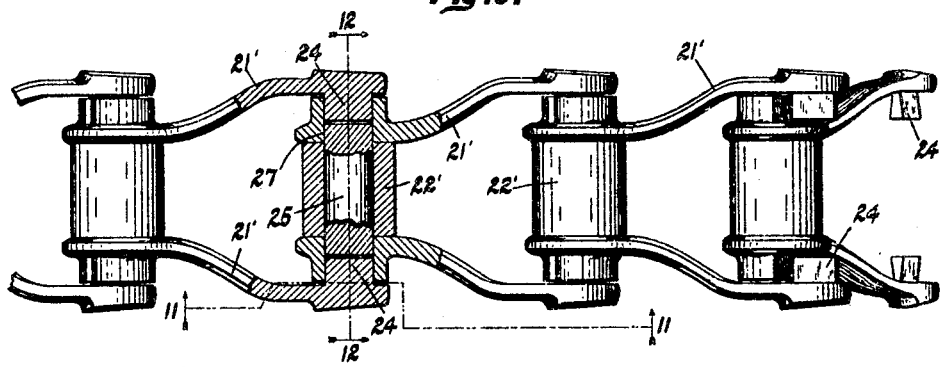
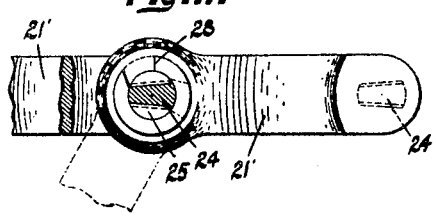
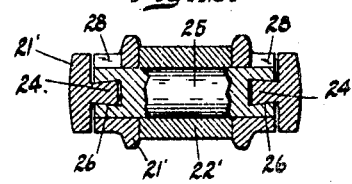

UNITED STATES PATENT OFFICE.

WILLIAM C. BRISSE, OF INDIANAPOLIS, INDIANA.

LINK BELT.

955,377.  Specification of Letters Patent.  Patented Apr. 19, 1910.

Application filed October 11, 1909. Serial No. 522,151.

*To all whom it may concern:*

Be it known that I, WILLIAM C. BRISSE, a citizen of the United States, residing at Indianapolis, in the county of Marion and State of Indiana, have invented certain new and useful Improvements in Link Belts, of which the following is a specification.

The object of my invention is to provide a link-belt composed of a series of duplicate parts of such form as to be readily manufactured, assembled and separated.

The accompanying drawings illustrate my invention.

Figure 1 is a plan in partial horizontal section of a portion of chain constructed in accordance with my invention, the side bars being formed integrally with the cross bar and provided with locking lugs and flanges; Fig. 2 is a similar view of a modified form, in which the locking flanges and lugs are omitted; Fig. 3 a section on line 3—3 of Fig. 1; Fig. 4 a section on line 4—4 of Fig. 1; Fig. 5 a section on line 5—5 of Fig. 2; Fig. 6 a section on line 6—6 of Fig. 2; Fig. 7 a view similar to Fig. 1 but in which the side bars are separate from the cross bar thus providing for a roller construction; Fig. 8 a view similar to Fig. 7 but showing a modification in which the locking lugs and flanges are omitted; Fig. 9 a section on line 9—9 of Fig. 7; Fig. 10 a section on line 10—10 of Fig. 7; Fig. 11 a section on line 11—11 of Fig. 8; Fig. 12 a section on line 12—12 of Fig. 8.

In Figs. 1 and 2 of the drawings, 21, 21 indicate a pair of side bars of a link which side bars are disconnected at one end but at the opposite end are connected by cross bar 22. The free end of each side bar 21 is provided with an inwardly projecting lug 24 which is flared toward its free end, as clearly shown in Fig. 4 and is also tapered longitudinally, as shown in Fig. 3 with its smaller end toward the cross bar 22.
Adapted to extend between each pair of lugs 24 is a removable connector pin 25 which is provided in its opposite ends with tapered dovetailed diametrical slots 26 which are adapted to receive and closely fit the lugs 24 so that when the connector pin is in position between the two lugs, it cannot be drawn forwardly out of alinement with said lugs and will bind said lugs together so as to prevent any transverse spreading of the free ends of the side bars 21. Each side bar 21 (and the cross-bar 22 in the forms shown in Figs. 1 and 2) is provided with an axial bore 27 adapted to receive and fit the connector pin 25 and to receive the lugs 24, the said lugs being properly shaped at their edges to enter the bores. At the end opposite lug 24, each side bar 21 is provided with a slot 28 which leads transversely into bore 27, each of said slots 28 having a proper dimension to permit the entrance of lugs 24. Thus far the two forms shown in Figs. 1 to 6 inclusive are identical but in the forms shown in Figs. 1, 3, 4, in order to form a further interlocking between adjacent links I provided the side bar 21, with circular locking flange 29 which is adapted to interlock behind a hook 31 carried by the opposite end of the adjacent side bars 21.

The forms shown in Figs. 7 and 8 differ from the forms shown in Figs. 1 and 2 in that the side bars 21', instead of being integrally connected with the cross bar, are separate, and, instead of the cross bar 22 I provide a bearing roller 22' which serves as a separator for the bored ends of the side bars and is rotatably mounted upon the connector pin 25 so as to thus provide a roller interaction with the sprocket wheel.

In assembling or separating the links they are brought to the position shown in dotted lines in Fig. 3 and in full lines at the right hand ends of Figs. 1, 2, 7 and 8, so that the open ends of slots 28 are in position to receive the lugs 24, the connector pin 25 being first slipped into the bore 27 and its dovetailed slots 26 turned so that their wider ends will register with the inner ends of the slots 28 whereupon by a forward sliding and upward turning movement of the link, as indicated by the arrows in Figs. 1 and 3, the parts may be assembled.

I claim as my invention:

1. A link-belt comprising a plurality of side bars each having an inwardly projecting dovetailed lug, a connecting pin having at its opposite ends transverse slots formed to fit the side bar lugs, each of the side bars being bored at its end opposite its lug-end to receive and journal upon a connecting pin.

2. A link-belt comprising a plurality of side bars each having an inwardly projecting dovetailed and transversely tapered lug, a connecting pin having at its opposite ends transverse slots formed to fit the side bar lugs, each of the side bars being bored at its end opposite its lug-end to receive and journal upon a connecting pin.

3. A link-belt comprising a plurality of side bars each having an inwardly projecting dovetailed lug, a connecting pin having at its opposite ends transverse slots formed to fit the side bar lugs, each of the side bars being bored at its end opposite its lug-end to receive and journal upon a connecting pin, and a roller journaled between the bored ends of each pair of side bars.

4. A link-belt comprising a plurality of side bars each having an inwardly projecting dovetailed and transversely tapered lug, a connecting pin having at its opposite ends transverse slots formed to fit the side bar lugs, each of the side bars being bored at its end opposite its lug-end to receive and journal upon a connecting pin, and a roller journaled between the bored ends of each pair of side bars.

5. A link-belt comprising a plurality of side bars each having an inwardly projecting dovetailed lug, a connecting pin having at its opposite ends transverse slots formed to fit the side bar lugs, each of the side bars being bored at its end opposite its lug-end to receive and journal upon a connecting pin, and a roller journaled between the bored ends of each pair of side bars upon the connecting pin.

6. A link-belt comprising a plurality of side bars each having an inwardly projecting dovetailed and transversely tapered lug, a connecting pin having at its opposite ends transverse slots formed to fit the side bar lugs, each of the side bars being bored at its end opposite its lug-end to receive and journal upon a connecting pin, and a roller journaled between the bored ends of each pair of side bars upon the connecting pin.

7. A link-belt comprising a plurality of side bars each having an inwardly projecting dovetailed lug, a connecting pin having at its opposite ends transverse slots formed to fit the side bar lugs, each of the side bars being bored at its end opposite its lug-end to receive and journal upon a connecting pin, each side bar having a locking finger, and each side bar having a coöperating locking flange to interlock with the locking finger of the adjacent side bar.

8. A link-belt comprising a plurality of side bars each having an inwardly projecting dovetailed and transversely tapered lug, a connecting pin having at its opposite ends transverse slots formed to fit the side bar lugs, each of the side bars being bored at its end opposite its lug-end to receive and journal upon a connecting pin, each side bar having a locking finger, and each side bar having a coöperating locking flange to interlock with the locking finger of the adjacent side bar.

9. A link-belt comprising a plurality of side bars each having an inwardly projecting dovetailed lug, a connecting pin having at its opposite ends transverse slots formed to fit the side bar lugs, each of the side bars being bored at its end opposite its lug-end to receive and journal upon a connecting pin, a roller journaled between the bored ends of each pair of side bars, each side bar having a locking finger, and each side bar having a coöperating locking flange to interlock with the locking finger of the adjacent side bar.

10. A link-belt comprising a plurality of side bars each having an inwardly projecting dovetailed and transversely tapered lug, a connecting pin having at its opposite ends transverse slots formed to fit the side bar lugs, each of the side bars being bored at its end opposite its lug-end to receive and journal upon a connecting pin, a roller journaled between the bored ends of each pair of side bars, each side bar having a locking finger, and each side bar having a coöperating locking flange to interlock with the locking finger of the adjacent side bar.

11. A link-belt comprising a plurality of side bars each having an inwardly projecting dovetailed lug, a connecting pin having at its opposite ends transverse slots formed to fit the side bar lugs, each of the side bars being bored at its end opposite its lug-end to receive and journal upon a connecting pin, a roller journaled between the bored ends of each pair of side bars upon the connecting pin, each side bar having a locking finger, and each side bar having a coöperating locking flange to interlock with the locking finger of the adjacent side bar.

12. A link-belt comprising a plurality of side bars each having an inwardly projecting dovetailed and transversely tapered lug, a connecting pin having at its opposite ends transverse slots formed to fit the side bar lugs, each of the side bars being bored at its end opposite its lug-end to receive and journal upon a connecting pin, a roller journaled between the bored ends of each pair of side bars upon the connecting pin, each side bar having a locking finger, and each side bar having a coöperating locking flange to interlock with the locking finger of the adjacent side bar.

13. A link belt comprising a plurality of side bars each having an inwardly projecting lug at one end, a removable pin extending between the lug ends of each pair of side bars and having portions interengaging with the lugs to limit movement of the cross bar relative to the lugs in one direction, each of said side bars being bored at its end opposite its lug-end to receive and journal upon a connecting pin.

14. A link belt comprising a plurality of side bars each having an inwardly projecting lug at one end, a removable pin extending between the lug ends of each pair of side bars and having portions interengaging with the lugs to limit movement of the cross bar relative to the lugs in one direction, each of said side bars being bored at its end opposite its lug-end to receive and journal upon a connecting pin and the lugs so as to normally retain the pin in position relative to the lugs.

In witness whereof, I have hereunto set my hand and seal at Indianapolis, Indiana, this eighth day of October, A. D. one thousand nine hundred and nine.

WILLIAM C. BRISSE. [L. S.]

Witnesses:
ARTHUR M. HOOD,
THOMAS W. MCMEANS.